Figure 1:
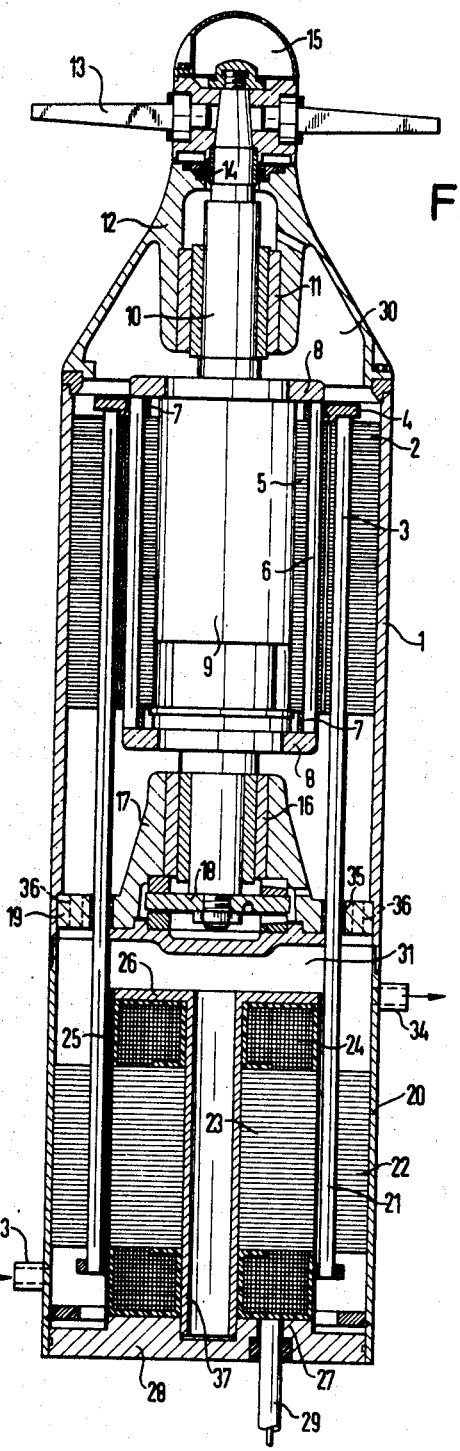

United States Patent

Pleuger

[15] 3,675,057
[45] July 4, 1972

[54] SUBMERSIBLE ELECTRIC MOTOR

[72] Inventor: Friedrich-Wilhelm Pleuger, Hamburg, Germany

[73] Assignee: Pleuger Unterwasserpumpen GmbH, Hamburg, Germany

[22] Filed: Dec. 24, 1970

[21] Appl. No.: 101,204

[30] Foreign Application Priority Data

Dec. 30, 1969 Germany ...................... P 19 65 543.7

[52] U.S. Cl. .................................310/68 D, 310/86, 310/87
[51] Int. Cl. ........................................................H02k 11/00
[58] Field of Search....................................310/86, 87, 68 D

[56] References Cited

UNITED STATES PATENTS 1,920,318   8/1933   Pfleger ............................310/68 D X
3,539,849   11/1970  Kampfen .................................310/67

Primary Examiner—D. X. Sliney
Attorney—Richards & Geier

[57] ABSTRACT

In a submersible liquid filled motor transformer assembly the stator and rotor members of the motor have bar windings. The bar windings of the stator are directly connected to the bar shaped secondary windings of the transformer, the primary windings of which are enclosed in a fluidtight cartridge which is interchangeable for connection to mains of different voltages and frequencies and exposed to the liquid filling of the assembly which also contacts the bar windings of both motor members.

11 Claims, 2 Drawing Figures

PATENTED JUL 4 1972

3,675,057

SHEET 1 OF 2

INVENTOR:
F.-W. Pleuger
BY: Richards & Geier
ATTORNEYS

INVENTOR:
F.-W. Pleuger

SUBMERSIBLE ELECTRIC MOTOR

DESCRIPTION

The invention relates to a submersible electric motor and particularly to a squirrel-cage motor which is combined with a transformer the secondary of which is of the bar wound type and used as stator windings of the motor.

A motor of this type has only short-circuit windings, the bars of which are exposed to only very low voltages such that the stator windings as well as the cage of the rotor do not require any insulation. This type of combined motor-transformer is particularly advantageous in underwater operation using three-phase alternating current since the rotary field of the transformer directly acts upon the motor.

In this connection the bars of the secondary windings of the transformer are led out from the housing in a fluid tight manner, necessitating the use of a large number of sealing gaskets in the housing of the transformer on which usually an insulating material has been cast, making it impossible to eliminate sufficiently the heat generated therein. The advantages of the low operating voltage of the motor and the savings with respect to insulation of the stator windings are, therefore, neutralized by way of the numerous seals of the bar windings and the insufficient elimination of heat from the transformer.

It is an object of the present invention to provide a submersible electric motor of the type described which obviates disadvantages of the sort previously noted. It is a further object of the invention to provide an improved submersible motor transformer assembly which enables an efficient elimination of the heat generated in the primary windings of the transformer.

Another object of the invention is to provide a submersible motor transformer assembly having an universally operational possibility. Still another object is the provision of a submersible motor transformer assembly which is adapted to be connected to mains of different voltages and frequencies.

A preferred embodiment of the invention intended to accomplish at least some of the foregoing objects comprises a transformer the primary windings of which are encapsulated in a fluid and vaporproof manner and the secondary windings of which are shaped as bar winding integral with the stator windings of the motor which secondary transformer windings and stator motor windings are directly exposed to the effect of a cooling medium. When the motor assembly is filled with a cooling fluid in the customary manner, a very effective elimination of the heat generated in the transformer section and particularly in its primary windings is achieved.

A very simple structure is obtained when a space containing the secondary transformer windings is in open communication with the fluid containing interior space of the motor. Such a type is particularly adapted to be used for submersible motors e.g. to drive deep well pumps or similar devices.

Squirrel-cage motors of the wet rotor type filled with a liquid are increasingly utilized not only to operate pumps for bucket elevators or in navel constructions to drive maneuvering means but also to drive reactor and high pressure circulating pumps mounted within a pressurized water circuit path. In order to protect the transformer from the heat of the pumped fluid tending to penetrate into the interior according to a further feature of the invention, a blocking or barrier zone is provided between the transformer and the motor. This zone may communicate with a separate cooling circuit, or the space surrounding the secondary section of the transformer forms a blocking zone connected to a separate cooling circuit. The bars of the secondary windings of the transformer, which are used as stator windings for the motor, need not be provided with compression-proof seals since they effect only a separation of both cooling circuits.

The motor which comprises in the stator and rotor only short-circuit bars without insulation may operate safely at high temperatures — as those existing in reactor or high pressure circulation pumps — if the bearings are correspondingly formed, e.g. coal bearings, and if the bundel of laminations is appropriately insulated.

A multi-polar arrangement of the motor can be obtained by a corresponding multi-polar development of the primary windings of the transformer.

Since, according to this invention only the primary windings of the transformer are encapsulated in a fluid proof manner, it is possible to arrange said windings in conformity with an additional feature of the invention so as to take the configuration of a cartridge. This cartridge is detachable and exchangeable for adapting the motor assembly to networks of different voltages or frequencies. This will allow an economical manufacture of the assembly, because all elements for different voltages and frequencies of the electric currant may have the same configuration. This cartridge may be arranged in the interior of the secondary windings of the transformer the bars of which form the stator windings which enclose the rotor of the Motor. It is likewise possible for the cartridge to enclose the secondary windings of the transformer, in which case the motor has an outer or external rotor. The cartridge type primary windings of the transformer may, for example, be sealed with cast resin and closed off to the outside by means of a thin tube of a material of low electric conductivity, which tube is known in the art as air-gab-tube Other objects and advantages of the invention will become apparent from the following detailed description of two embodiments of the invention in connection with the accompanying drawings, wherein FIG. 1 is a central longitudinal sectional view of a combined motor-transformer, having an internal rotor, and FIG. 2 is the same sectional view of a combined motor-transformer, having an external rotor.

Figure 2:
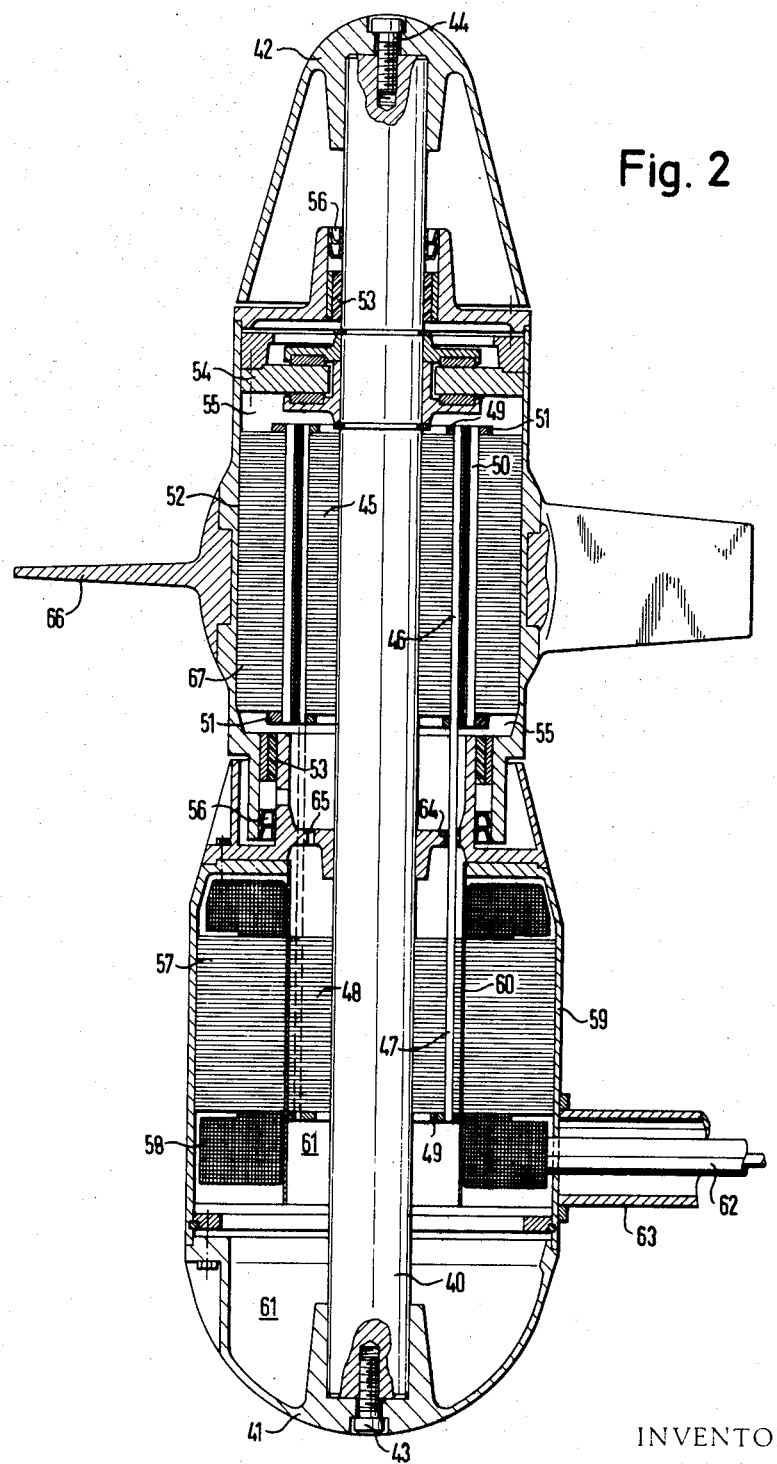

Referring to FIG. 1 of the drawings a three-phase squirrel cage induction motor has an elongated tubular housing 1, which encloses the usual stator elements 2 together with stator windings in form of bar windings 3 and a short-circuit ring 4. The rotor 5 comprises annular laminations with cage windings 6 and two short-circuit rings 7 as well as two balancing rings 8 mounted on both frontal faces. The rotor is mounted on an enlarged portion 9 of a vertical shaft 10 housed on its upper free end by way of a radial sleeve bearing 11, in a bell-shaped bracket 12, flange-mounted to the tubular housing 1. The end of the motor shaft 10 carries a rotary disk 13 of a fluid pump, e.g. a centrifugal pump. The motor is immerged in the liquid which is to be pumped. The motor shaft 10 is sealed off against this surrounding liquid by means of a gasket 14. On the hub of the rotary disk 13 there is provided a sealing cap 15.

The lower end of motor shaft 10 away from the driving end side is supported by means of a sleeve bearing 16 in an intermediate casing 17 enclosing a thrust bearing 18, to submit to the axial thrust of the motor. Said casing 17 is secured to the motor housing 1 by means of an annular flange forming a partition wall 19.

The bar windings 3 constituting the stator windings of the motor are downwardly elongated and through said partition wall 19 are introduced into the housing 20 of a transformer arranged beneath the motor housing 1. Thereby said windings 3 define the secondary windings 21 of the transformer which windings are intermediately spaced in an annular secondary 22 of the transformer. Its primary section 23 with three-phase primary windings 24 is enclosed by said secondary section 22 and shaped in the configuration of a cartridge. This cartridge is fluidtightly sealed by means of an air gap tube 25 the upper end of which is attached to a plate 26. Said cartridge is supported by an internal projection 27 of a bottom plate 28, which is penetrated by current supply leads 29 connecting the primary windings 24 to three-phase mains.

After detaching the bottom plate 28 the cartridge together with the laminated primary section 23 and the primary windings 24 of the transformer may be removed and replaced by a cartridge with another primary section and other windings such that the motor transformer assembly may be connected to mains of different voltages and/or frequencies only after interchanging said cartridge without altering its configuration and structure. The motor transformer assembly is immerged in the liquid to be pumped and is cooled by a fluid cooling system. For this purpose an internal space or compartment 30 of the motor is filled with a liquid such as pure water which also lubricates the sleave bearing 11, 16 and the thrust bearing 18. An internal space or compartment 31 of the transformer is provided with a separate cooling circuit the cooling fluid of which is admitted via a pipe socket 33 mounted at the lower end of the transformer housing 20. The cooling fluid is led off via a pipe socket 34 arranged beneath the partition wall 19.

In order to prevent the cooling fluid from passing out of the transformer compartment 31 into the motor compartment 30 all entrances of the bar windings 3, 21 in the partition wall 19 are sealed by an insulating gasket 35 which need not be of the compression-proof type since it is only necessary to keep both cooling media separated from each other, which media are not pressurized.

All heat generated in the primary windings 24 is effectively led off or eliminated by way of the transformer cooling system being separate from that of the motor system. On the other hand, since the bar windings 3 and 5 of the motor are not insulated on account of their low tension and since the motor bearings 11, 16, 18 are resistant to high temperatures the motor transformer assembly according to the invention is operationally reliable at temperatures to which conventional motors having insulated stator windings are not adapted.

If this motor transformer assembly is not intended for use in such special cases as e.g. to drive propellers serving as auxiliary maneuvering means of ships, it is possible to save the special cooling circuit of the transformer. In this case, ports represented in the drawing by dashed lines 36 are arranged in the partition wall 19 which ports are sufficient for the heat abduction, and the pipe sockets 33 and 34 for admittance and removal of the cooling medium can be saved.

The removal of the heat generated in the primary windings 24 of the transformer is improved furthermore by the annular configuration of the primary section 23 and the arrangement of the primary windings 24 on a lower tubular extension 37 of the plate 26.

Instead of liquid cooling it is likewise possible to use another cooling fluid such as air or gas in the motor transformer assembly according to the invention. Such cooling fluid may e.g. be sufficient for certain reactor drives.

In the embodiment according to FIG. 2 of the drawings an external rotor motor in combination with a transformer is used instead of the conventional motor with an internal rotor. The motor shaft 10 of FIG. 1 is here replaced by a stationary axis 40 mounted between a lower housing cap 41 and an upper housing cap 42 by means of axial screws 43 and 44.

On the axis 40 a stator element 45 is secured, the stator windings of which comprise bar windings 46 forming a prolongation of secondary windings 47 of the secondary section 48 of the transformer. Both ends of the bar windings 46 and 47 are, as previously described, with reference to FIG. 1, interconnected by way of short circuit rings 49. A rotor 67 surrounding the stator element 45 carries cage windings 50 with both short circuit rings 51 and is attached to the interior of a shell 52 rotatably supported on the stationary axis 40 by means of two radial journal bearings 53 and a thrust bearing 54. The shell 52 is provided with a propeller 66 which could be replaced, however, by a rotor disc for a pump, an axial or semi-axial wheel, a helical wheel or a helical gear which could be used as a drill.

An internal space or compartment 55 of the motor is filled with a liquid which also lubricates the bearings 53 and 54. Leakage of the liquid at the radial journals 53 is prevented by the provision of gaskets 56.

The secondary section 48 of the transformer which carries the secondary windings 47 is surrounded by a primary section 57, which together with three-phase primary windings 58 and a housing 59 is shaped as an easily interchangeable cartridge separated in a fluid and gas-proof manner by means of an airgab-tube 60 from the internal space 61 of the transformer. A supply cable 62 surrounded by a protective tube 63 admits alternating current to the primary windings 58 of the transformer.

The bars 46 of the stator windings of the motor and bars 47 of the secondary windings of the transformer separately pass through a partition wall 64 provided with recesses 65 for the liquid contained in the motor space 55 to pass into the internal space 61 of the transformer if both sections are filled with a common cooling fluid. However, it is possible for the transformer section to be equipped with a separate cooling circuit in the same manner as illustrated in the first embodiment of FIG. 1.

Between the motor and transformer section there may be provided a heat barrier in the form of a heat insulating partition; for this purpose the partition wall 19 of FIG. 1 or 64 of FIG. 2 could e.g. be covered with a heat insulating layer or manufactured of heat insulating material.

In all cases, merely by fluid and gas-proof encapsulation of the primary member of the transformer connected to the mains and by cooling same is it possible by the motor-transformer assembly of the invention to have the motor work at an essentially higher operating temperature as hitherto realized with customary motors provided with insulated stator windings.

Although I have shown and described the invention as applied to a particular motor it is to be understood that this is solely by way of example, and that the novel features are susceptible of embodiments in motor pumps of various constructions and in motors for other uses.

What I claim is:

1. A submersible electric motor assembly, comprising a motor housing, a transformer housing constituting a continuation of said motor housing, a motor located in said motor housing and having a stator and a rotor, bar-shaped windings located in said stator and said rotor, a transformer located in said transformer housing and having a primary section of windings and a secondary section of windings, means supplying alternating current to the windings of the primary section, said means being fluidtightly sealed, the windings of said secondary section compressing bar-shaped windings constituting a continuation of the bar-shaped windings located in said stator, a liquid filling said motor and transformer housings, and means sealing the primary section of windings of the transformer against said liquid, both of said bar-shaped windings being exposed to said liquid.

2. A motor assembly in accordance with claim 1, wherein the last-mentioned means have the shape of a cartridge removably mounted in said transformer housing.

3. A motor assembly in accordance with claim 1, wherein said transformer housing is in communication with said motor housing.

4. A motor assembly in accordance with claim 3, comprising a partition wall between said motor housing and said transformer housing and a heat barrier zone with a cooling system connected with said partition wall.

5. A motor assembly in accordance with claim 3, wherein said transformer housing comprises means admitting a fluid circuit constituting a heat barrier into the interior of the transformer housing.

6. A motor assembly according to claim 4, wherein the partition wall between the motor and transformer housing comprises a heat insulating means.

7. A motor assembly according to claim 6, wherein the heat insulating partition wall is arranged between the motor and the heat barrier zone.

8. A motor assembly according to claim 7, wherein the heat insulating partition wall is arranged between the heat barrier zone and the transformer housing.

9. A motor assembly according to claim 1, wherein the motor is of external rotor type construction.

10. A motor assembly according to claim 9, wherein the external rotor type motor is constructed as a drill.

11. A motor assembly according to claim 1, wherein the primary windings of the transformer are of the multi-polar type.

* * * * *